United States Patent
Serrat et al.

(10) Patent No.: US 12,215,232 B2
(45) Date of Patent: Feb. 4, 2025

(54) ASPHALT COMPOSITIONS INCLUDING RECYCLED POLYMER AND EPOXY-FUNCTIONALIZED ETHYLENE COPOLYMER

(71) Applicant: Dow Global Technologies LLC, Midland, MI (US)

(72) Inventors: Cristina Serrat, Lake Jackson, TX (US); Charles J. DuBois, Jr., Lake Jackson, TX (US); Hayley A. Brown, Lake Jackson, TX (US); Jorge C. Gomes, São Paulo (BR); Renata de Oliveria Pimentel, São Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 231 days.

(21) Appl. No.: 17/424,351

(22) PCT Filed: Jan. 31, 2020

(86) PCT No.: PCT/US2020/016133
§ 371 (c)(1),
(2) Date: Jul. 20, 2021

(87) PCT Pub. No.: WO2020/160423
PCT Pub. Date: Aug. 6, 2020

(65) Prior Publication Data
US 2022/0112378 A1  Apr. 14, 2022

Related U.S. Application Data

(60) Provisional application No. 62/859,505, filed on Jun. 10, 2019, provisional application No. 62/799,536, filed on Jan. 31, 2019.

(51) Int. Cl.
*C08L 95/00* (2006.01)
*E01C 7/26* (2006.01)

(52) U.S. Cl.
CPC .............. *C08L 95/00* (2013.01); *E01C 7/265* (2013.01); *C08L 2205/03* (2013.01); *C08L 2555/34* (2013.01)

(58) Field of Classification Search
CPC .. C08L 95/00; C08L 2205/03; C08L 2555/34; E01C 7/265
USPC ......................................................... 524/68
See application file for complete search history.

(56) References Cited

U.S. PATENT DOCUMENTS

| | | |
|---|---|---|
| 3,645,992 A | 2/1972 | Elston |
| 3,914,342 A * | 10/1975 | Mitchell ................. C08L 23/04 525/240 |
| 4,076,698 A | 4/1993 | Anderson et al. |
| 5,221,702 A | 6/1993 | Richards |
| 5,272,236 A | 12/1993 | Lai et al. |
| 5,278,272 A | 1/1994 | Lai et al. |
| 5,331,028 A | 7/1994 | Goodrich |
| 5,367,007 A | 11/1994 | Richards |
| 5,380,773 A | 1/1995 | Bellio et al. |
| 5,558,703 A | 9/1996 | Bredael |
| 5,582,923 A | 12/1996 | Kale et al. |
| 5,733,155 A | 3/1998 | Sagawa |
| 5,854,045 A | 12/1998 | Fang et al. |
| 6,743,838 B2 * | 6/2004 | Statz ...................... C08L 95/00 524/68 |
| 7,157,508 B2 | 1/2007 | Dean |
| 7,160,935 B2 | 1/2007 | Prejean |
| 8,901,212 B2 | 12/2014 | Pillai et al. |

(Continued)

FOREIGN PATENT DOCUMENTS

| | | |
|---|---|---|
| CA | 2125554 C | 4/2002 |
| CN | 101864102 B | 11/2011 |

(Continued)

OTHER PUBLICATIONS

Yadollahi, et al; Improving the Performance of Crumb Rubber bitumen by means of Poly Phosphoric Acid (PPA) and Vestenamar additives; Construction and Building Materials; 2011; 3108-3116; 25.
International Preliminary Report on Patentability for Application No. PCT/US2020/0169133 dated Jul. 27, 2021, pp. 1-21.
Communication pursuant to Rules 161 (1) and 162 EPC for EP Application No. 20708964.0, dated Sep. 8, 2021, pp. 1-3.
United States Statutory Invention Registration No. H1250, published Nov. 2, 1993 by Gilmore et al.
International Search Report and Written Opinion pertaining to PCT/US2020/016133, dated May 8, 2020.

(Continued)

*Primary Examiner* — Ling Siu Choi
*Assistant Examiner* — Ronald Grinsted
(74) *Attorney, Agent, or Firm* — Dinsmore & Shohl LLP

(57) ABSTRACT

The present disclosure provides embodiments of an asphalt composition and methods of making that may include asphalt binder; a recycled polymer component; an epoxy-functionalized ethylene copolymer, the epoxy-functionalized ethylene copolymer having the formula E/X/Y/Z. E may be a copolymer unit —(CH$_2$CH$_2$)— derived from ethylene; X may be a copolymer unit —(CH$_2$CR$^1$R$^2$)—, where R$^1$ is hydrogen, methyl, or ethyl, and R$^2$ is carboalkoxy, acyloxy, or alkoxy of 1 to 10 carbon atoms, present in from 0 to about 40 weight % of the copolymer; Y may be a copolymer unit —(CH$_2$CR$^3$R$^4$)—, where R$^3$ is hydrogen or methyl and R$^4$ is carboglycidoxy or glycidoxy present in from 0 to about 25 weight % of the copolymer; Z may be a copolymer derived from comonomers including carbon monoxide, sulfur dioxide, acrylonitrile, or other monomers, present from 0 to about 10 weight % of the copolymer.

18 Claims, No Drawings

(56) References Cited

U.S. PATENT DOCUMENTS

| | | | | |
|---|---|---|---|---|
| 2003/0036590 A1* | 2/2003 | Liang | ...................... | C08L 95/00 524/68 |
| 2006/0243163 A1* | 11/2006 | Martin | ...................... | C08K 3/30 524/68 |
| 2010/0048771 A1* | 2/2010 | Osborn | ................... | C08L 95/00 524/70 |
| 2015/0105496 A1 | 4/2015 | Naidoo et al. | | |
| 2018/0030276 A1 | 2/2018 | De Garavilla et al. | | |
| 2018/0155548 A1 | 6/2018 | Naidoo et al. | | |

FOREIGN PATENT DOCUMENTS

| | | |
|---|---|---|
| CN | 102408729 A | 4/2012 |
| CN | 102585522 B | 6/2014 |
| CN | 104212043 A | 12/2014 |
| CN | 102863679 B | 3/2015 |
| CN | 104861676 A | 8/2015 |
| CN | 105153511 A | 12/2015 |
| CN | 105199405 A | 12/2015 |
| CN | 103525100 B | 2/2016 |
| CN | 104016612 B | 6/2016 |
| CN | 105820391 A | 8/2016 |
| CN | 104830032 B | 1/2017 |
| CN | 106317921 A | 1/2017 |
| CN | 106519715 A | 3/2017 |
| CN | 104559258 B | 5/2017 |
| CN | 106751960 A | 5/2017 |
| CN | 104448864 B | 10/2017 |
| CN | 107245248 A | 10/2017 |
| CN | 107365506 A | 11/2017 |
| CN | 107446210 A | 12/2017 |
| CN | 107474563 A | 12/2017 |
| EP | 0698149 A1 | 2/1996 |
| JP | H1179813 A | 3/1999 |
| JP | 2001045880 A | 2/2001 |
| JP | 2013513695 A | 4/2013 |
| JP | 2013192488 A | 9/2013 |
| JP | 2017532232 A | 11/2017 |
| JP | 2018523717 A | 8/2018 |
| KR | 20100025081 A | 3/2010 |
| KR | 101031531 B1 | 4/2011 |
| WO | 9425678 A1 | 11/1994 |
| WO | 02060832 A1 | 8/2002 |
| WO | 2017015104 A1 | 1/2017 |
| WO | 2017027225 A1 | 2/2017 |
| WO | 2017116831 A1 | 7/2017 |

OTHER PUBLICATIONS

Anderson, Mike, "Introduction to the MSCR Test and Specification: Questions, Clarifications, and Emphasis", Asphalt Institute, Asphalt Binder ETG Meeting, Sep. 15-16, 2015, pp. 1-39.

Anderson, Mike, "Introduction to the Multiple-Stress Creep-Recovery (MSCR) Test and its Use in the PG Binder Specification" Asphalt Institute, 2014, 54th Annual Idaho Asphalt Conference, pp. 1-89.

Anonymous: "Implementation of the Multi-Stress Creep Asphalt Binder Specification", 2015, pp. 1-9, XP055688437.

Chiono et al., "Reactive compatibilizer precursors for LDPE/PA6 blends. III: ethylene-glycidylmethacrylate copolymer", Polymer, 2003, pp. 2423-2432.

Degussa AG, High Performance Polymers, "VESTENAMER, the rubber with unique properties", 2001, pp. 1-12.

Domingos et al., "Erratum to: Rheological analysis of asphalt binders modified with Elvaloy® terpolymer and bolyphosphoric acid on the multiple stress creep and recovery test", Materials and Structures, 2015, 1417.

Domingos et al., "Rheological analysis of asphalt binders modified with Elvaloy® terpolymer and polyphosphoric acid on the multiple stress creep and recovery test", Materials and Structures, 2015, 1405-1416.

DuPont Elvaloy 5160, Elvaloy RET Resin Product Data Sheet, 2018, pp. 1-2, XP055688640.

Elvaloy, "The Chemistry that Paves the Way for Better Performance", DOW, 2018, pp. 1-3, XP055688244.

Fuentes-Auden et al., "Evaluation of thermal and mechanical properties of recycled polyethylene modified bitumen", Polymer Testing, 2008, pp. 1005-1012.

Gonzalez, Manual Navarro, Rechnische Universitat Berlin, "Rheology and engineering parameters of bitumen modified with polyolefins, elastomers and reactive polymers", 2010, Polymertechnik / Kunststofftechnikum.

Harder, Gregory A., "NEAUPG Binder Committee Activities", Asphalt Institute, 2018, 38.

Hinislioglu et al., "Use of waste high density polyethylene as bitumen modifier in asphalt concrete mix", Materials Letters, 2004, pp. 267-271.

Kishchynskyi et al., "Improving Quality and Durability of Bitumen and Asphalt Concrete by Modification Using Recycled Polyethylene Based Polymer Composition", Procedia Engineering, 2016, pp. 119-127.

Masson, J-F., "Brief Review of the Chemistry of Polyphosphoric Acid (PPA) and Bitumen", Energy and Fuels, 2008, pp. 2637-2640.

Polacco et al., "Relation between polymer architecture and nonlinear viscoelastic behavior of modified asphalts", Current Opinion in Colloid and Interface Science, 2006, pp. 230-245.

REDWAVE: Video "Recycling—Waste Treatment—Sorting plant for 100,000 tonnes of residential waste", 2017, pp. 1-5. Retrieve from internet: https://www.youtube.com.watch?v=rWP9Fiwamrl.

Silva et al., Wastes: Solutions, Treatments and Opportunities, "Waste Polymers Recycling in High Performance Asphalt Mixtures", 1st Int'l Conference, Sep. 12-14, 2011, pp. 1-6.

Tiwari et al., "Study of Plastic Waste Mixed Bitunlinous Concrete Using Dry Process for Road Construction", The Asian Review of Civil Engineering, 2017, pp. 1-6.

U.S. Department of Transportation, Federal Highway Adminstration, TechBrief "The Multiple Stress Creep Recovery (MSCR) Procedure", 2011, pp. 1-9. Retrieved from the Internet: URL:http://www.fhwa.dot.gov/pavement/mater ials/pubs/hif11038/hif11038.pdf.

VDI Zentrum Ressourceneffizienz video, "Recycling Plastics— Resource efficiency with an optimized sorting method", 2018, pp. 1-7. Retrieve from internet: https://www.youtube.com/watch?v=I fUpP-hq3A.

Chinese Office Action dated Mar. 1, 2023, pertaining to CN Patent Application No. 2020800167563.9, 11 pgs.

Brazilian Technical Report dated Aug. 21, 2023, pertaining to BR Patent Application No. BR11202104732.2, 8 pgs.

Chinese Office Action dated Sep. 21, 2023, pertaining to CN Patent Application No. 202080016756.9, 6 pgs.

European Examination Report dated Nov. 9, 2023, pertaining to EP Patent Application No. 20708964.0, 6 pgs.

Pereira et al. "Modification of thermal and rheological behavior of asphalt binder bythe addition of an ethylene-methyl acrylate-glycidyl methacrylate terpolymer and polyphosphoric acid", Polimeros, 27(4), pp. 298-308, 2017.

Gama et al. "Rheological studies of asphalt modified with elastomeric polymer", Construction and Building Matrials 106 (2016) pp. 290-295.

Gama et al. "Optimizing the use of reactive terpolymer polyphosphoric acid and high-density polyethylene to achieve asphalt binders with superior performance", Construction and Building Materials 169 (2018) pp. 522-529.

Jew et al. "Polyethlene-Modified Bitumen for Paving Applications", Journal of Applied Polymer Science, vol. 31, pp. 2685-2704 (1986).

Japanese Office Action dated Dec. 26, 2023, pertaining to JP Patent Application No. 2021-543397, 30 pgs.

Japanese Office Action dated May 7, 2024, pertaining to JP Patent Application No. 2021-543397, 6 pgs.

\* cited by examiner

ASPHALT COMPOSITIONS INCLUDING RECYCLED POLYMER AND EPOXY-FUNCTIONALIZED ETHYLENE COPOLYMER

CROSS-REFERENCE TO RELATED APPLICATIONS

This application is a National Stage Entry under 35 U.S.C. § 371 of International Patent Application No. PCT/US2020/016133, filed Jan. 31, 2020, which claims priority to U.S. Provisional Patent Application No. 62/799,536, filed on Jan. 31, 2019, and U.S. Provisional Patent Application No. 62/859,505, filed Jun. 10, 2019, the entire disclosures of which are hereby incorporated by reference.

TECHNICAL FIELD

Embodiments described herein generally relate to asphalt and specifically relate to asphalt compositions including a recycled polymer component and an epoxy-functionalized ethylene copolymer.

BACKGROUND

Asphalt compositions may often be used as construction materials. For example, an asphalt composition may be used as pavement in the construction of roads. Several factors may affect pavement performance, such as bitumen quality, crude sources, load traffic, and more recently, sustainability considerations.

After repeated load applications, fatigue cracking or permanent deformation, known as "rutting," may occur. It is believed that the elastic and cracking properties of the asphalt binder may play a role in such failure modes. For example, an asphalt binder with excessive stiffness may be insufficient to prevent permanent deformation in response to repeated loads. Additionally, thermal cracking may occur at relatively lower temperatures when stresses exceed the tensile strength of the pavement. As such, an asphalt composition may exhibit improved rutting, fatigue, and thermal cracking resistance by having higher elastic properties at various temperature regimes.

SUMMARY

As such, there are needs for asphalt compositions with properties that may increase resistance to failure modes such as rutting or fatigue cracking at various temperature regimes.

Embodiments of the present disclosure meet those needs by providing asphalt compositions that may include asphalt binder; a recycled polymer component; and an epoxy-functionalized ethylene copolymer. Without being bound by theory, it is believed that the recycled polymer component may increase resistance to permanent deformation, with respect to the modified asphalt composition's resistance to rutting and fatigue at various temperature regimes. Moreover, it is believed that the functionalization of polymers, like an epoxy-functionalized ethylene copolymer as described herein, may be an effective route of chemically binding a material to enhance the rheological and tensile properties of an asphalt composition that includes bitumen.

Moreover, it may be a sustainable option to incorporate a recycled polymer component into an asphalt composition. Agencies in many jurisdictions throughout the world, including the United States Department of Transportation (DOT) and many states, have approved recycled materials that may be incorporated in asphalt compositions. Some recycled materials may include ground rubber tire (GTR), recycled asphalt pavement (RAP), and recycled asphalt shingles (RAS). In other regions, like India and some Association of Southeast Asian Nations (ASEAN) countries, local governments have been sponsoring and even regulating the use of waste plastic packaging in asphalt. Post-industrial recycle (PIR) and post-consumer recycle (PCR) are generally considered commercially-available selected sources of consumer- or industrially-used plastic packaging.

Embodiments of the asphalt compositions described herein may incorporate recycled polymer component with an epoxy-functionalized ethylene copolymer, which may increase sustainability benefits, in addition to providing improved resistance to rutting or fatigue cracking at various temperature regimes. As compared to asphalt compositions with a polymer component that has not been recycled, the asphalt compositions described herein may have improved or comparable resistance to rutting or fatigue cracking at various temperature regimes. However, while having improved or comparable properties, as compared to asphalt compositions with a polymer component that has not been recycled, the asphalt compositions described herein may further have increased sustainability benefits.

However, the incorporation of recycled polymers would conventionally result in asphalt compositions with poor fatigue and thermal cracking. As an alternative, some conventional asphalt compositions have either incorporated a styrene/conjugated diene copolymer or epoxy-functionalized ethylene copolymer alone or in combination.

As such, the presently-described asphalt compositions, which may include an epoxy-functionalized ethylene copolymer, may exhibit improved performance (i.e., a relatively higher elasticity) as compared to asphalt compositions with only recycled polymer component. Additionally, the asphalt compositions described herein may exhibit improved performance (i.e., a relatively higher elasticity and resistance to fatigue and thermal cracking) than asphalt compositions that incorporate a recycled polymer component and a styrene/conjugated diene copolymer.

According to at least one embodiment of the present disclosure, asphalt compositions are provided. Embodiments of the asphalt composition that may include asphalt binder in about 70 to about 99.5 weight %, based on the total weight of the asphalt composition; a recycled polymer component in about 0.25 to 20 weight %, based on the total weight of the asphalt composition; an epoxy-functionalized ethylene copolymer in about 0.1 to 10 weight %, based on the total weight of the asphalt composition, the epoxy-functionalized ethylene copolymer having the formula E/X/Y/Z. E may be a copolymer unit —$(CH_2CH_2)$— derived from ethylene; X may be a copolymer unit —$(CH_2CR^1R^2)$—, where $R^1$ is hydrogen, methyl, or ethyl, and $R^2$ is carboalkoxy, acyloxy, or alkoxy of 1 to 10 carbon atoms, present in from 0 to about 40 weight % of the copolymer; Y may be a copolymer unit —$(CH_2CR^3R^4)$—, where $R^3$ is hydrogen or methyl and $R^4$ is carboglycidoxy or glycidoxy present in from 0 to about 25 weight % of the copolymer; Z may be a copolymer derived from comonomers including carbon monoxide, sulfur dioxide, acrylonitrile, or other monomers, present from 0 to about 10 weight % of the copolymer. As such, embodiments of the present disclosure may provide compositions with improved properties that may increase resistance to rutting or fatigue cracking at various temperature regimes. Embodiments of the present disclosure may also provide compositions that are sustainable or environmentally-friendly.

Accordingly to at least another embodiment of the present disclosure, a method of making an asphalt composition is provided. Embodiments of the method may include combining an asphalt binder, a recycled polymer component, and an epoxy-functionalized ethylene copolymer, the epoxy-functionalized ethylene copolymer having the formula E/X/Y/Z. E may comprise a copolymer unit —($CH_2CH_2$)— derived from ethylene; X may comprise a copolymer unit —($CH_2CR^1R^2$)—, where $R^1$ is hydrogen, methyl, or ethyl, and $R^2$ is carboalkoxy, acyloxy, or alkoxy of 1 to 10 carbon atoms, present in from 0 to about 40 weight % of the copolymer; Y may comprise the copolymer unit —($CH_2CR^3R^4$)—, where $R^3$ is hydrogen or methyl and $R^4$ is carboglycidoxy or glycidoxy present in from 0 to about 25 weight % of the copolymer; and, optionally, Z may comprise the copolymer derived from comonomers including carbon monoxide, sulfur dioxide, acrylonitrile, or other monomers, present from 0 to about 10 weight % of the copolymer.

These and other embodiments are described in more detail in the following Detailed Description.

DETAILED DESCRIPTION

Specific embodiments of the present application will now be described. These embodiments are provided so that this disclosure will be thorough and complete and will fully convey the scope of the subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "propylene-based polymer," as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

The term "LLDPE," includes resin made using Ziegler-Natta catalyst systems as well as resin made using single-site catalysts, including, but not limited to, bis-metallocene catalysts (sometimes referred to as "m-LLDPE"), phosphin-imine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. Nos. 3,914,342 and 5,854,045). The LLDPE resins can be made via gas-phase, solution-phase, or slurry polymerization or any combination thereof, using any type of reactor or reactor configuration known in the art.

The term "HDPE" refers to ethylene-based polymers having densities greater than about 0.940 g/cc, which are generally prepared with Ziegler-Natta catalysts, chrome catalysts or even metallocene catalysts.

As used herein, the term "asphalt" is a complex mixture that may be separated into two major fractions of hydrocarbons, asphaltenes and maltenes. The asphaltenes may be polycyclic aromatics and may contain polycyclic aromatics that mostly have polar functionality. One or more of the following functionalities may be present: carboxylic acids, amines, sulfides, sulfoxides, sulfones, sulfonic acids, porphyrins, porphyrin derivatives, metalloporphyrins or metal-loporphyrin derivatives comprising cations of vanadium, nickel or iron. The maltene phase may contain polar aromatics, aromatics, and naphthene. Without being bound by theory, it is generally believed that asphalt may be a colloidal dispersion with the asphaltenes dispersed in the maltenes and the polar aromatics may function as dispersing agents. The asphaltenes may be relatively high in molecular weight (about 1500 daltons) as compared with the other components of asphalt. The asphaltenes may be amphoteric in nature and form aggregates through self-association that offer some viscoelastic behavior to asphalt. Asphaltenes may vary in amount and functionality depending on the crude source from which the asphalt is derived. Specific examples of suitable crude asphalts may include Ajax, Marathon, Wyoming Sour, Mayan, Venezuelan, Canadian, Arabian, Trinidad Lake, Salamanca, Brazilian, Argentinean, Uruguayan, Chilean and combinations of two or more thereof. asphalt binder. The term "asphalt" may include an "asphalt binder," which includes one or more of bitumen, asphaltenes; heterocyclic compounds containing sulphur, nitrogen, and oxygen; and trace amounts of metals such as iron, nickel, and vanadium. The term "asphalt" may further include aggregates. Aggregates may include stone, sand, gravel, and combinations thereof.

Reference will now be made in detail to embodiments of asphalt compositions as described herein. Embodiments of the asphalt compositions may include asphalt binder; a recycled polymer component; and an epoxy-functionalized ethylene copolymer.

In embodiments, the asphalt composition described herein may include asphalt binder, which may be referred to as "an asphalt component" of the asphalt composition. In some embodiments, the asphalt binder may include a petroleum derivative. The asphalt binder may include bitumen. Bitumen may be saturated and unsaturated hydrocarbons (e.g., aliphatic and aromatic hydrocarbons). In addition, the asphalt binder may include one or more asphaltenes; heterocyclic compounds containing sulphur, nitrogen, and oxygen; and trace amounts of metals such as iron, nickel, and vanadium. In some embodiments, the asphalt binder may be commercially-available. In some embodiments, the asphalt binder may be naturally-occurring. In some embodiments, the asphalt binder may include from about 70 weight percent (wt. %) to 100 wt. % of bitumen, based on the total weight of the asphalt binder. In other embodiments, the asphalt binder may be at least 90% of bitumen. In other embodiments, the asphalt may include up to 100 wt. % of bitumen.

In embodiments, the asphalt composition may include from about 70 weight percent (wt. %) to about 99.5 wt. % asphalt binder, based on the total weight of the asphalt composition. In some embodiments, the asphalt composition may include from about 70 wt. % to about 95 wt. %, from about 70 wt. % to about 90 wt. %, from about 70 wt. % to about 85 wt. %, from about 70 wt. % to about 80 wt. %, from about 70 wt. % to about 75 wt. %, from about 75 wt. % to about 99.5 wt. %, from about 75 wt. % to about 95 wt. %, from about 75 wt. % to about 90 wt. %, from about 75 wt. % to about 85 wt. %, from about 75 wt. % to about 80 wt. %, from about 80 wt. % to about 99.5 wt. %, from about 80 wt. % to about 95 wt. %, from about 80 wt. % to about 90 wt. %, from about 80 wt. % to about 85 wt. %, from about 85 wt. % to about 99.5 wt. %, from about 85 wt. % to about 95 wt. %, from about 85 wt. % to about 90 wt. %, from about 90 wt. % to about 99.5 wt. %, from about 90 wt. % to about 95 wt. %, or from about 95 wt. % to about 99.5 wt. % asphalt binder, based on the total weight of the asphalt composition.

In embodiments, the asphalt composition may include a recycled polymer component. The recycled polymer component may include a polymeric material that has previously undergone a thermoforming or extrusion process. As used herein, a recycled polymer component may include a post-industrial recycle (PIR) or post-consumer recycle (PCR) polymeric material and that has been repurposed for reuse. In some embodiments, the recycled polymer component may be a commercially available source of consumer-used or industrially-used plastic packaging. In further embodiments, the recycled polymer component may include a PCR plastic packaging product, which has been used by a consumer and is repurposed for reuse. In embodiments, the recycled polymer component may include one or more of an ethylene-based polymer, a propylene-based polymer, a polyester, a poly(vinyl chloride), a polystyrene, an acrylonitrile butadiene styrene, a polyamide, an ethylene vinyl alcohol, an ethylene vinyl acetate, a poly-vinyl chloride and/or ethylene or propylene functionalized copolymers, with Maleic Anhydride, Methacrylic acid and Acrylic acid, as: FUSABOND™, AMPLIFY™, BYNEL™ SURLYN™, NUCREL™ (used as tie layer on multilayer structure). In embodiments, the recycled polymer component may include up to 99.99 wt. % of one or more of an ethylene-based polymer, a propylene-based polymer, a polyester, a poly (vinyl chloride), a polystyrene, an acrylonitrile butadiene styrene, a polyamide, an ethylene vinyl alcohol, an ethylene vinyl acetate, or a poly-vinyl chloride, based on the total weight of the recycled polymer component. In other embodiments, the recycled polymer component may include from about 51 wt. % to about 99.99 wt. %, from about 60 wt. % to about 99.99 wt. %, from about 70 wt. % to about 99.99 wt. %, from about 80 wt. % to about 99.99 wt. %, or from about 90 wt. % to about 99.99 wt. % of one or more of an ethylene-based polymer, a propylene-based polymer, a polyester, a poly(vinyl chloride), a polystyrene, an acrylonitrile butadiene styrene, a polyamide, an ethylene vinyl alcohol, an ethylene vinyl acetate, or a poly-vinyl chloride, based on the total weight of the recycled polymer component. In further embodiments, the recycled polymer component may include an ethylene-based polymer.

In embodiments, the recycled polymer component may include one or more contaminants. The contaminants may be the result of the polymeric material's use prior to being repurposed for reuse. In some embodiments, contaminants may include paper, ink, food residue, or other recycled materials in addition to the polymer, which may result from the recycling process. In one specific embodiment, the recycled polymer component may include a PCR polymeric material and paper, which results from plastic packaging with a paper label. In embodiments, the recycled polymer component may include at least 0.01 wt. % contaminants based on the total weight of the recycled polymer component. In other embodiments, the recycled polymer component may include at least from about 0.01 wt. % to about 1 wt. %, from about 0.01 wt. % to about 5 wt. %, from about 0.01 wt. % to about 10 wt. %, from about 0.01 wt. % to about 20 wt. %, from about 0.01 wt. % to about 30 wt. %, or from about 0.01 wt. % to about 40 wt. % contaminants based on the total weight of the recycled polymer component.

In embodiments, the recycled polymer component may exhibit color properties. In embodiments, because the recycled polymer component may include one or more contaminants, the recycled polymer component may exhibit color properties that are different than the color properties of the polymer prior to it being recycled. For example, in embodiments, the recycled polymer component may have a non-zero yellowness index. In further embodiments, the recycled polymer component may have a yellowness index of greater than 5 when measured according to ASTM D6290. In some embodiments, the yellowness of the recycled polymer component may have a yellowness index less than 0, for example, if the recycled polymer component has a blue hue. Without being bound by theory, and according to the Commission Internationale de l'Eclairage (CIE), the L*a*b* color space is modeled after a color-opponent theory stating that two colors cannot be red and green at the same time or yellow and blue at the same time. ΔL* (defined as L* of the sample minus L* of the standard) indicates the difference in lightness and darkness, where a more positive value indicates a lighter color and a more negative value indicates a darker color. Δa* (defined as a* of the sample minus a* of the standard) indicates the difference in red and green where a more positive value indicates a redder color, and a more negative value indicates a greener color. Δb* (defined as b* of the sample minus b* of the standard) indicates the difference in yellow and blue, where a more positive value indicates a yellower color, and a more negative value indicates a bluer color. L* indicates lightness, a* is the red/green coordinate, and b* is the yellow/blue coordinate. ΔL*, Δa*, and Δb* may be positive (+) or negative (−). The total difference, ΔE*, however, is always positive.

Incorporating a recycled polymer component into the asphalt composition may provide an asphalt composition with sustainability benefits. In further embodiments, while providing sustainability benefits, the presently-described asphalt compositions may be resistant to failure modes such as rutting and cracking at various temperature regimes. Additionally, while having improved or comparable properties, when compared to asphalt compositions with a polymer component that has not been recycled, the asphalt compositions described herein may further have increased sustainability benefits. In some embodiments, the recycled polymer component may include an HDPE. In some embodiments, the recycled polymer component may include an LLDPE. In further embodiments, the recycled polymer component may include a combination of HDPE and LLDPE.

In further embodiments, the recycled polymer component may include an LLDPE having a density of from about 0.858 grams per cubic centimeter (g/cc) to about 0.918 g/cc, from about 0.858 g/cc to about 0.910 g/cc, from about 0.858 g/cc to about 0.900 g/cc, from about 0.858 g/cc to about 0.890 g/cc, from about 0.858 g/cc to about 0.880 g/cc, from about 0.858 g/cc to about 0.870 g/cc, from about 0.870 grams per cubic centimeter (g/cc) to about 0.918 g/cc, from about 0.870 g/cc to about 0.910 g/cc, from about 0.870 g/cc to about 0.900 g/cc, from about 0.870 g/cc to about 0.890 g/cc, from about 0.870 g/cc to about 0.880 g/cc, from about 0.880 grams per cubic centimeter (g/cc) to about 0.918 g/cc, from about 0.880 g/cc to about 0.910 g/cc, from about 0.880 g/cc to about 0.900 g/cc, from about 0.880 g/cc to about 0.890 g/cc, from about 0.890 grams per cubic centimeter (g/cc) to about 0.918 g/cc, from about 0.890 g/cc to about 0.910 g/cc, from about 0.890 g/cc to about 0.900 g/cc, from about 0.900 grams per cubic centimeter (g/cc) to about 0.918 g/cc, from about 0.900 g/cc to about 0.910 g/cc, or from about 0.910 grams per cubic centimeter (g/cc) to about 0.918 g/cc.

In some embodiments, the recycled polymer component may include an LLDPE with a melt index, $I_2$, of less than about 20 grams per ten minutes (g/10 min) when measured according to ASTM D1238 at 190° C. and 2.16 kg load. In further embodiments, the LLDPE may have a melt index, $I_2$, from about 0.1 g/10 min to about 20.0 g/10 min, from about 0.1 g/10 min to about 15.0 g/10 min, from about 0.1 g/10 min to about 10.0 g/10 min, from about 0.1 g/10 min to about 5 g/10 min, from about 0.1 g/10 min to about 1.0 g/10 min, from about 0.1 g/10 min to about 0.5 g/10 min, from about 1.0 g/10 min to about 20.0 g/10 min, from about 1.0 g/10 min to about 15.0 g/10 min, from about 1.0 g/10 min to about 10.0 g/10 min, from about 1.0 g/10 min to about 5 g/10 min, from about 5.0 g/10 min to about 20.0 g/10 min, from about 5.0 g/10 min to about 15.0 g/10 min, from about 5.0 g/10 min to about 10.0 g/10 min, from about 10.0 g/10 min to about 20.0 g/10 min, from about 10.0 g/10 min to about 15.0 g/10 min, or from about 15.0 g/10 min to about 20.0 g/10 min.

In further embodiments, the recycled polymer component may include an HDPE having a density of from about 0.940 g/cc to about 0.970 g/cc, from about 0.940 g/cc to about 0.960 g/cc, from about 0.940 g/cc to about 0.950 g/cc, from about 0.950 g/cc to about 0.970 g/cc, from about 0.950 g/cc to about 0.960 g/cc, or from about 0.960 g/cc to about 0.970 g/cc.

In some embodiments, the recycled polymer component may include an HDPE with a melt index, $I_2$, of less than about 20 grams per ten minutes (g/10 min) when measured according to ASTM D1238 at 190° C. and 2.16 kg load. In further embodiments, the HDPE may have a melt index, $I_2$, from about 0.1 g/10 min to about 20.0 g/10 min, from about 0.1 g/10 min to about 15.0 g/10 min, from about 0.1 g/10 min to about 10.0 g/10 min, from about 0.1 g/10 min to about 5 g/10 min, from about 0.1 g/10 min to about 1.0 g/10 min, from about 0.1 g/10 min to about 0.5 g/10 min, from about 1.0 g/10 min to about 20.0 g/10 min, from about 1.0 g/10 min to about 15.0 g/10 min, from about 1.0 g/10 min to about 10.0 g/10 min, from about 1.0 g/10 min to about 5 g/10 min, from about 5.0 g/10 min to about 20.0 g/10 min, from about 5.0 g/10 min to about 15.0 g/10 min, from about 5.0 g/10 min to about 10.0 g/10 min, from about 10.0 g/10 min to about 20.0 g/10 min, from about 10.0 g/10 min to about 15.0 g/10 min, or from about 15.0 g/10 min to about 20.0 g/10 min.

In embodiments, the asphalt composition may include from about 0.25 weight percent (wt. %) to about 20 wt. % recycled polymer component, based on the total weight of the asphalt composition. In some embodiments, the asphalt composition may include from about 0.25 wt. % to about 20 wt. %, from about 0.25 wt. % to about 15 wt. %, from about 0.25 wt. % to about 10 wt. %, from about 0.25 wt. % to about 5 wt. %, from about 0.25 wt. % to about 1 wt. %, from about 1 wt. % to about 20 wt. %, from about 1 wt. % to about 15 wt. %, from about 1 wt. % to about 10 wt. %, from about 1 wt. % to about 5 wt. %, from about 5 wt. % to about 20 wt. %, from about 5 wt. % to about 15 wt. %, from about 5 wt. % to about 10 wt. %, from about 10 wt. % to about 20 wt. %, from about 10 wt. % to about 15 wt. %, or from about 15 wt. % to about 20 wt. % recycled polymer component, based on the total weight of the asphalt composition.

In embodiments, the asphalt composition may include an epoxy-functionalized ethylene copolymer. The epoxy-functionalized ethylene copolymer may be represented by the formula E/X/Y/X, which includes copolymer units E, X, Y, and Z.

In embodiments, E may be a copolymer unit —($CH_2CH_2$)— derived from ethylene.

In embodiments, X may be a copolymer unit —($CH_2CR^1R^2$)—. In some embodiments, $R^1$ may be hydrogen, methyl, or ethyl. In some embodiments, $R^2$ is carboalkoxy, acyloxy, or alkoxy of 1 to 10 carbon atoms. In further embodiments, the epoxy-functionalized ethylene copolymer may include from about 0 wt. % to about 40 wt. % X, from about 0 wt. % to about 30 wt. % X, from about 0 wt. % to about 20 wt. % X, from about 0 wt. % to about 10 wt. % X, from about 10 wt. % to about 40 wt. % X, from about 10 wt. % to about 30 wt. % X, from about 10 wt. % to about 20 wt. % X, from about 20 wt. % to about 40 wt. % X, from about 20 wt. % to about 30 wt. % X, or from about 30 wt. % to about 40 wt. % X, based on the total weight of the epoxy-functionalized ethylene copolymer.

In embodiments, Y may be a copolymer unit —($CH_2CR^3R^4$)—. In some embodiments, $R^3$ may be hydrogen or methyl. In some embodiments, $R^4$ may be carboglycidoxy or glycidoxy. In some embodiments, Y may be selected from the group consisting of glycidyl acrylate, glycidyl methacrylate, glycidyl butyl acrylate, glycidyl vinyl ether, and combinations of two or more of glycidyl acrylate, glycidyl methacrylate, glycidyl butyl acrylate, and glycidyl vinyl ether. In further embodiments, the epoxy-functionalized ethylene copolymer may include from about 0 wt. % to about 25 wt. % Y, from about 0 wt. % to about 20 wt. % Y, from about 0 wt. % to about 15 wt. % Y, from about 0 wt. % to about 10 wt. % Y, from about 0 wt. % to about 5 wt. % Y, from about 5 wt. % to about 25 wt. % Y, from about 5 wt. % to about 20 wt. % Y, from about 5 wt. % to about 15 wt. % Y, from about 5 wt. % to about 10 wt. % Y, from about 10 wt. % to about 25 wt. % Y, from about 10 wt. % to about 20 wt. % Y, from about 10 wt. % to about 15 wt. % Y, from about 15 wt. % to about 25 wt. % Y, from about 15 wt. % to about 20 wt. % Y, or from about 20 wt. % to about 25 wt. % Y, based on the total weight of the epoxy-functionalized ethylene copolymer.

In embodiments, Z may be a copolymer derived from comonomers including carbon monoxide, sulfur dioxide, acrylonitrile, or other monomers. In further embodiments, the epoxy-functionalized ethylene copolymer may optionally include from about 0 wt. % to about 10 wt. % Z, from about 0 wt. % to about 8 wt. % Z, from about 0 wt. % to about 6 wt. % Z, from about 0 wt. % to about 4 wt. % Z, from about 0 wt. % to about 2 wt. % Z, from about 2 wt. % to about 10 wt. % Z, from about 2 wt. % to about 8 wt. % Z, from about 2 wt. % to about 6 wt. % Z, from about 2 wt. % to about 4 wt. %, from about 4 wt. % to about 10 wt. % Z, from about 4 wt. % to about 8 wt. % Z, from about 4 wt. % to about 6 wt. % Z, from about 6 wt. % to about 10 wt. % Z, from about 6 wt. % to about 8 wt. % Z, or from about 8 wt. % to about 10 wt. % Z, based on the total weight of the epoxy-functionalized ethylene copolymer.

In embodiments, the epoxy-functionalized ethylene copolymer may include an ethylene vinyl acetate glycidyl methacrylate terpolymer, an ethylene n-butyl acrylate glycidyl methacrylate terpolymer or an ethylene methyl acrylate glycidyl methacrylate terpolymer.

In embodiments, the asphalt composition may include from about 0.1 weight percent (wt. %) to about 10 wt. % epoxy-functionalized ethylene copolymer, based on the total weight of the asphalt composition. In some embodiments, the asphalt composition may include from about 0.1 wt. % to about 5 wt. %, from about 0.1 wt. % to about 1 wt. %, from about 0.1 wt. % to about 0.5 wt. %, from about 0.5 wt. % to about 10 wt. %, from about 0.5 wt. % to about 5 wt. %, from about 0.5 wt. % to about 1 wt. %, from about 1 wt. % to about 10 wt. %, from about 1 wt. % to about 5 wt. %, or from about 5 wt. % to about 10 wt. % epoxy-functionalized ethylene copolymer, based on the total weight of the asphalt composition.

In some embodiments, the epoxy-functionalized ethylene copolymer may have a melt flow index as determined by ASTM D1238-65T, Condition E, of about 1000 g/10 min or less, from about 0.3 g/10 min to about 1000 g/10 min, from about 0.3 g/10 min to about 500 g/10 min, from about 0.3 g/10 min to about 250 g/10 min, or from about 0.3 g/10 min to about 100 grams/10 minutes.

Without being bound by theory, it is believed that the functionalization of polymers may be an effective route of chemically binding a material to enhance the rheological and tensile properties of an asphalt composition including bitumen. Comparatively, non-functional modification may require approximately twice as much epoxy-functionalized ethylene copolymer to achieve the same specifications for an asphalt composition. A therefore sustainable option may include incorporating a recycled polymer component into an asphalt composition. Additionally, it may be possible to incorporate more recycled polymer component, thereby increasing sustainability benefits, by also incorporating an epoxy-functionalized ethylene copolymer into the asphalt composition.

Without being bound by theory, it is believed the epoxy-functionalized ethylene copolymer may be relatively more compatible with ethylene-based polymers as compared to other polymers. As such, embodiments of asphalt compositions with an ethylene-based polymer as the recycled polymer component with the epoxy-functionalized ethylene copolymer may exhibit relatively improved performance results as compared to some other embodiments with other polymers. In further embodiments, asphalt compositions with a recycled polymer component including LLDPE, HDPE, or combinations and the epoxy-functionalized ethylene copolymer may exhibit relatively improved results as compared to some other embodiments with other polymers.

The asphalt composition may optionally further comprise one or more polymers in addition to the recycled polymer component, referred to herein as "additional polymers." The one or more additional polymers may not react with asphalt or with the epoxy-functionalized ethylene copolymers described herein. Because the one or more additional polymers may not react with the asphalt or with the epoxy-functionalized ethylene copolymers, they may be referred to as "diluent" polymers.

In some embodiments, the one or more additional polymers may include a styrene/conjugated-diene copolymer. In further embodiments, the one or more additional polymers may include poly-styrene-butadiene-styrene (SBS) copolymers. Styrene/conjugated-diene block copolymers include polymers derived from, or comprising copolymerized units of, styrene and a conjugated diene, such as butadiene, isoprene, ethylene butene, or 1,3-pentadiene. The styrene/conjugated-diene copolymers may be di-, tri- or poly-block copolymers having a linear or radial (star or branched) structure, with or without a random junction. Suitable styrene/conjugated-diene copolymers include, for example, diblock A-B type copolymers; linear (triblock) A-B-A type copolymers; and radial (A-B)$_n$ type copolymers; wherein A refers to a copolymer unit derived from styrene and B refers to a copolymer unit derived from a conjugated diene. Preferred styrene/conjugated-diene copolymers have a linear (triblock) A-B-A type structure or a radial (A-B)$_n$ type structure.

In embodiments, the styrene/conjugated diene copolymer may include from about 10 wt. % to about 50 wt. % or from about 20 wt. % to about 40 wt. % of copolymer units derived from styrene, based on the total weight of the styrene/conjugated diene copolymer. In embodiments, the styrene/conjugated diene block copolymer may include from about 50 wt. % to about 90 wt. % or from about 60 wt. % to about 80 wt. % of copolymer units derived from a conjugated diene, based on the total weight of the styrene/conjugated diene copolymer. In further embodiments, the styrene/conjugated diene block copolymer may include from about 50 wt. % to about 90 wt. % or from about 60 wt. % to about 80 wt. % of copolymer units derived from a butadiene or isoprene, based on the total weight of the styrene/conjugated diene copolymer. In further embodiments, 20 to 40 weight % of the copolymer units may be derived from styrene, the remainder being derived complementarily from the conjugated diene. As used herein, the term "complementarily" refers to a set of values having a sum of unity, such as, for example, the sum of the weight percentages of the components in a composition.

The styrene/conjugated-diene copolymer may have a weight-average molecular weight from about 10,000 daltons to about 1,000,000 daltons. The weight-average molecular weight of the styrene/conjugated-diene copolymer may be determined using conventional gel permeation chromatography. In other embodiments, the styrene/conjugated-diene copolymer may have a weight-average molecular weight from about 10,000 daltons to about 750,000 daltons, from about 10,000 daltons to about 600,000 daltons, from about 10,000 daltons to about 500,000 daltons, from about 30,000 daltons to about 1,000,000 daltons, from about 30,000 daltons to about 750,000 daltons, from about 30,000 daltons to about 600,000 daltons, from about 30,000 daltons to about 500,000 daltons, from about 100,000 daltons to about 1,000,000, from about 100,000 daltons to about 750,000 daltons, from about 100,000 daltons to about 600,000 daltons, from about 100,000 daltons to about 500,000 daltons, from about 150,000 daltons to about 1,000,000 daltons, from about 150,000 daltons to about 750,000 daltons, from about 150,000 daltons to about 600,000 daltons, from about 150,000 daltons to about 500,000 daltons, from about 200,000 daltons to about 1,000,000 daltons 200,000 daltons to about 750,000 daltons, from about 200,000 daltons to about 600,000 daltons, or from about 200,000 daltons to about 500,000 daltons. In some embodiments, the weight-average molecular mass of the copolymer of styrene and of butadiene is from about 10,000 daltons to about 600,000 daltons, or from about 30,000 daltons to about 400,000 daltons.

The melt flow index of the styrene/conjugated diene copolymer may be from about 0 g/10 min to about 200 g/10 min, from about 0 g/10 min to about 100 g/10 min, or from about 0 g/10 min to 10 g/10 min, about 0.1 g/10 min to about 200 g/10 min, from about 0.1 g/10 min to about 100 g/10 min, or from about 0.1 g/10 min to 10 g/10 min, as determined by ASTM Test Method D 1238, Condition G.

The styrene/conjugated diene copolymer may be prepared by anionic polymerization of the monomers in the presence of initiators composed of organometallic compounds of alkali metals, in particular organolithium compounds, such as alkyllithium and in particular butyllithium, the preparation being carried out at temperatures of less than or equal to 0° C. and in solution in a solvent that is at least partly composed of a polar solvent, such as tetrahydrofuran or diethyl ether.

In embodiments, the asphalt composition may include one or more additives. The one or more additives may allow the asphalt composition to have improved stability and may influence the rheological properties of the asphalt composition. In some embodiments, the one or more additives may allow for the asphalt composition to include crosslinking with sulfur. In further embodiments, the one or more additives may include sulfur-based additives. Commercially-available sulfur-based additives may include BGA from Ergon, Inc., which includes hydrotreated naphthenic petroleum oil, elemental sulfur, a rheological additive, and other components.

In embodiments, the asphalt composition may include an acid. In some embodiments, the acid may be polyphosphoric aid. In further embodiments, the polymer-enhanced asphalt composition may include from about 0.05 wt. % to about 1 wt. %, from about from about 0.05 wt. % to about 0.8 wt. %, from about 0.05 wt. % to about 0.6 wt. %, from about 0.05 wt. % to about 0.4 wt. %, from about 0.05 wt. % to about 0.2 wt. %, from about 0.2 wt. % to about 1 wt. %, from about from about 0.2 wt. % to about 0.8 wt. %, from about 0.2 wt. % to about 0.6 wt. %, from about 0.2 wt. % to about 0.4 wt. %, from about 0.4 wt. % to about 1 wt. %, from about from about 0.4 wt. % to about 0.8 wt. %, from about 0.4 wt. % to about 0.6 wt. %, from about 0.6 wt. % to about 1 wt. %, from about from about 0.6 wt. % to about 0.8 wt. %, or from about 0.8 wt. % to about 1 wt. % acid, based on the total weight of the asphalt composition.

In embodiments, the asphalt composition may include an anhydride. In further embodiments, the asphalt composition may include from about 0.05 wt. % to about 1 wt. %, from about from about 0.05 wt. % to about 0.8 wt. %, from about 0.05 wt. % to about 0.6 wt. %, from about 0.05 wt. % to about 0.4 wt. %, from about 0.05 wt. % to about 0.2 wt. %, from about 0.2 wt. % to about 1 wt. %, from about from about 0.2 wt. % to about 0.8 wt. %, from about 0.2 wt. % to about 0.6 wt. %, from about 0.2 wt. % to about 0.4 wt. %, from about 0.4 wt. % to about 1 wt. %, from about from about 0.4 wt. % to about 0.8 wt. %, from about 0.4 wt. % to about 0.6 wt. %, from about 0.6 wt. % to about 1 wt. %, from about from about 0.6 wt. % to about 0.8 wt. %, or from about 0.8 wt. % to about 1 wt. % anhydride, based on the total weight of the asphalt composition.

In embodiments, the asphalt composition may have an upper continuous grade higher than the unmodified asphalt binder source. The upper continuous grade is determined as the temperature at which $G^*/\sin(\delta)=1$, as explained subsequently in this disclosure. In other embodiments, the asphalt composition may have an upper continuous grade of from about 52° C. to about 100° C., from about 52° C. to about 94° C., from about 52° C. to about 88° C., from about 52° C. to about 82° C., from about 52° C. to about 76° C., from about 52° C. to about 70° C., from about 52° C. to about 64° C., or from about 52° C. to about 58° C.

In embodiments, the asphalt composition may have a phase angle of less than the unmodified binder. The phase angle defines the resistance to shear deformation of the asphalt binder in the linear viscoelastic region and may depend upon the magnitude of the shear strain. Desirably, phase angles are below 750 for most asphalt applications. In other embodiments, the asphalt composition may have a phase angle of from about 550 to about 75°, from about 550 to about 70°, from about 550 to about 65°, from about 550 to about 60°, from about 600 to about 75°, from about 60° to about 70°, from about 60° to about 65°, from about 65° to about 75°, from about 65° to about 70°, or from about 70° to about 75°.

In embodiments, the asphalt composition may have an elastic recovery of at least 50%. Elastic recovery may be used to measure the percentage by which a sample recovers after tensile deformation using a ductilometer. Without being bound by theory, it is believed a higher percent elastic recovery implies more elastic behavior of the sample after deformation. The elastic recovery may be determined in accordance with Texas Department of Transportation procedure TEX-539-C, AASHTO T301, or ASTM 6084. In other embodiments, the asphalt composition may have an elastic recovery of from about 50% to about 90%, from about 50% to about 80%, or from about 50% to about 70%.

In embodiments, the asphalt composition may have a separation difference of 2.2° C. measured according to ASTM D5976. In some embodiments, the separation difference may be from about 0° C. to about ±2° C., from about 0° C. to about ±1° C., or from about ±1° C. to about ±2° C.

To produce the asphalt composition, asphalt binder may be blended with the recycled polymer component and the epoxy-functionalized ethylene copolymer. In some embodiments, the asphalt binder may be heated so that it may be blended with the recycled polymer component, the epoxy-functionalized ethylene copolymer, or both. In some embodiments, the asphalt binder may be heated to up to 200° C. In other embodiments, the asphalt may be heated to a temperature from about 100° C. to about 200° C., from about 100° C. to about 180° C., from about 100° C. to about 160° C., from about 100° C. to about 140° C., from about 100° C. to about 120° C., from about 120° C. to about 200° C., from about 120° C. to about 180° C., from about 120° C. to about 160° C., from about 120° C. to about 140° C., from about 140° C. to about 200° C., from about 140° C. to about 180° C., from about 140° C. to about 160° C., from about 160° C. to about 200° C., from about 160° C. to about 180° C., or from about 180° C. to about 200° C.

In some embodiments, to produce the asphalt composition, the epoxy-functionalized ethylene copolymer, the recycled polymer component, or a combination may be blended with the asphalt binder first. In some further embodiments, the epoxy-functionalized ethylene copolymer, the recycled polymer component, or the combination may be blended with the asphalt binder for from about 0.5 hours to about 4 hours, from about 0.5 hours to about 3 hours, from about 0.5 hours to about 2 hours, from about 0.5 hours to about 1 hour, from about 1 hour to about 5 hours, from about 1 hour to about 4 hours, from about 1 hour to about 3 hours, from about 1 hour to about 2 hours, from about 2 hours to about 5 hours, from about 2 hours to about 4 hours, from about 2 hours to about 3 hours, from about 3 hours to about 5 hours, from about 3 hours to about 4 hours, or from about 4 hours to about 5 hours. In other embodiments, the epoxy-functionalized ethylene copolymer, the recycled polymer component, or a combination may then be added and blended to produce embodiments of the presently-described asphalt composition.

In some embodiments of producing the asphalt composition, after the asphalt, the recycled polymer component, and the epoxy-functionalized ethylene copolymer have been blended, additional polymers, acid, or anhydride may be added and blended for from about 0.5 hours to about 2 hours, from about 0.5 hours to about 1 hour, or from about 1 hour to about 2 hours.

In another embodiment, to produce the asphalt composition, the recycled polymer component may be added directly to an aggregate without the asphalt binder. In some embodiments, the aggregate may be heated prior to mixing of the recycled polymer component and the asphalt binder. In some embodiments, the asphalt binder may be mixed with the epoxy-functionalized ethylene copolymer separately from the recycled polymer component and the aggregate. In further embodiments, a mixture of the asphalt binder and the epoxy-functionalized ethylene copolymer may be mixed with a mixture of the recycled polymer component and the aggregate.

Test Methods

The American Association of State Highway and Transportation Officials (AASHTO) is a standard setting body that publishes specifications, test protocols and guidelines for asphalt compositions, which may be used in highway design and construction. The test methods as used herein include the following:

Rheological Properties (Upper Continuous Grade, Phase Angle, and Elastic Recovery)

Dynamic Shear Rheometer failure temperature and phase angle measurements were performed according to the AASHTO T315-12 "Standard Method of Test for Determining the Rheological Properties of Asphalt Binder Using a Dynamic Shear Rheometer (DSR)". This method characterizes the viscous and elastic behavior of asphalt binders at medium temperatures (i.e. 52° C.) to high temperatures (i.e. 100° C.). The Dynamic Shear Rheometer test method may be used to determine the dynamic shear modulus (G*) and phase angle (6) of unaged or aged asphalt binders under dynamic or oscillatory shear using parallel plate geometry. The linear viscoelastic properties of the asphalt binders are derived from these values. The dynamic shear modulus (G*) may be considered the sample's total resistance to deformation when repeatedly sheared. The phase angle (δ) may be considered the lag between the applied shear stress and the resulting shear strain. The Upper Continuous Grade is determined as the temperature at which G*/sin(δ)=1.

The phase angle defines the resistance to shear deformation of the asphalt binder in the linear viscoelastic region. The larger the phase angle (δ), the more viscous the material. A purely elastic material may have a phase angle (δ) of about 0 degrees. A purely viscous material may have a phase angle (δ) of about 90 degrees. The phase angle may depend upon the magnitude of the shear strain. Phase angle for both unmodified and modified asphalt decreases with increasing shear strain. Desirably, phase angles are below 75° for most asphalt applications.

Elastic recovery was measured in accordance with Texas Department of Transportation procedure TEX-539-C, AASHTO T301, or ASTM 6084. Elastic recovery is used to measure percentage a sample recovers after tensile deformation using a ductilometer. It is believed a higher percent elastic recovery implies more elastic behavior of the sample after deformation.

Multiple Stress Creep and Recovery

Rolling Thin-Film Oven aged samples were studied using Multiple Stress Creep and Recovery (MSCR) at 67° C. in accordance with AASHTO T350-14 "Standard Method of Test for Multiple Stress Creep Recovery (MSCR) Test of Asphalt Binder Using a Dynamic Shear Rheometer (DSR)". The percent recovery value from the MSCR test is believed to be a measure of the elastic response of the sample. The non-recoverable creep compliance is believed to be an indicator of resistance of the asphalt binder to permanent deformation after repeated exposure to a load of known stress.

Intermediate Temperature Testing

Intermediate temperature testing at 25° C. using AASHTO T315 was performed after aging according to AASHTO T240-13 "Standard Method of Test for Effect of Heat and Air on a Moving Film of Asphalt Binder (Rolling Thin-Film Oven Test)" and AASHTO R28-12 "Standard Practice for Accelerated Aging of Asphalt Binder Using a Pressurized Aging Vessel (PAV)". To perform the intermediate temperature testing, the residue after aging was tested. The asphalt binder should be elastic to allow energy dissipation to prevent cracking, yet not too stiff to also avoid cracking. In asphalt applications, lower values of G*sin(δ) typically indicate improved properties. In further embodiments, the maximum G*sin(δ) value may be 5000 kPa. at grade temperature Stiffness The average of two measurements were used with AASHTO T313-12 "Standard Method of Test for Determining the Flexural Creep Stiffness of Asphalt Binder Using the Bending Beam Rheometer (BBR)" to determine the stiffness and m-value of the aged sample beam at −12° C. It is believed that low temperature cracking performance is related to the creep stiffness and slope of the logarithm of the creep stiffness versus the logarithm of the time curve of the asphalt binder.

Separation Properties

Separation properties were measured according to ASTM D7173 "Standard practice for determining the separation tendency of polymer from polymer modified asphalt". It is believed that a sample that has been heat aged for 48 hours at 163+5° C. and the softening point properties of the top and bottom sections compared provides information regarding the stability of the polymer modified asphalt formulation. A separation difference of 2.2° C. or less is considered a passing result.

Force Ductility Ratio

The force ductility ratio was determined by measuring the tensile stress induced on a specimen pulled apart at 5 cm/min in a 4° C. water bath as specified in AASHTO T300. This test may serve as an indicator that polymer is present in the asphalt sample if the material ruptures during elongation. When plotted as a function of force vs elongation, if two peaks are present, the force ductility ratio may be defined as the ratio of the second vs the first peak or as the ratio of the force at 30 cm and the first peak.

EXAMPLES

The following examples illustrate features of the present disclosure but are not intended to limit the scope of the disclosure. The following experiments analyzed the performance of embodiments of asphalt compositions described herein.

To produce Comparative Examples and Examples described below, a modified blending can was made using a one-quart can equipped with a heating mantle. The one-quart can's lid was modified to include a center hole of about 1 cm in diameter to accommodate a stirring shaft and second hole of about 3 mm in diameter to accommodate a thermocouple probe. The stirring shaft was threaded through the lid so that the lid could be sealed on the sample can when the stirring shaft and motor are positioned to mix the sample.

Examples 1-4

The materials used to produce Examples 1-4 included asphalt binder sourced from Valero (TX) as the asphalt binder; an LLDPE-rich post-consumer recycled resin, Natura PCR sourced from Avangard Innovative (Houston TX) with a yellowness index of 35.56 as the recycled polymer component; ELVALOY™ RET EP1177 sourced from DowDuPont (Wilmington DE) as the epoxy-functionalized ethylene copolymer; polyphosphoric acid (PPA) sourced from Innophos (Cranbury NJ).

To produce Examples 1, 2, 3, and 4, 450 grams (g) or 650 g of asphalt were poured into a modified blending can (as described above), and the lid and stirrer assembly were attached to the can. The modified blending can was heated to 165° C. and, once the temperature had stabilized, the epoxy-functionalized ethylene copolymer, the recycled polymer component, and polyphosphoric were added to the modified blending can in the ratios indicated in Table 1. The epoxy-functionalized ethylene copolymer was added first mixed for two hours. The recycled polymer component was added second and mixed for two hours. The polyphosphoric was then added and mixed for one hour. The sample was then stored in a 163° C. oven overnight before testing was performed.

TABLE 1

Compositions of Examples 1-4.

| SAMPLE | PCR (wt. %) | ELVALOY™ (wt. %) | SBS (wt. %) | PPA (wt. %) | BGA (wt. %) |
| --- | --- | --- | --- | --- | --- |
| Example 1 | 1.5 | 0.9 | 0 | 0.2 | 0 |
| Example 2 | 1.5 | 1.8 | 0 | 0.2 | 0 |
| Example 3 | 3 | 0.9 | 0 | 0.2 | 0 |
| Example 4 | 3 | 1.8 | 0 | 0.2 | 0 |

Example 5

The materials used to produce Example 5 included asphalt binder sourced from Marathon Petroleum Corporation (Detroit MI) as the asphalt binder (PG58-28); an LLDPE-rich post-industrial recycled (PIR) resin with a yellowness index of 12.36 as the recycled polymer component containing approximately 75% LLDPE, 20% polyamide, and 5% ethylene vinyl alcohol; ELVALOY™ RET EP 1177 sourced from Dow Inc. (Midland MI) as the epoxy-functionalized ethylene copolymer; polyphosphoric acid (PPA) sourced from Innophos (Cranbury NJ).

To produce Examples 5, 300 grams (g) or of asphalt were poured into a modified blending can (as described previously). A high shear blender was used to process the PIR at 185° C. until the blend was homogeneous (usually 10 to 30 minutes). The blend was then transferred to the lid and stirrer assembly previously described (low shear blending). The modified blending can was heated to 185° C. and, once the temperature had stabilized, the epoxy-functionalized ethylene copolymer was added in the ratios indicated in Table 2 and mixed for two hours. Polyphosphoric acid was then added and mixed for one hour. The sample was then stored in a 163° C. oven overnight before testing was performed.

TABLE 2

Compositions of Example 5.

| SAMPLE | PIR (wt. %) | ELVALOY™ (wt. %) | SBS (wt. %) | PPA (wt. %) | BGA (wt. %) |
| --- | --- | --- | --- | --- | --- |
| Example 5 | 2 | 1.6 | 0 | 0.32 | 0 |

Comparative Examples 1-4

The materials used to produce Comparative Examples 1-4 included asphalt binder sourced from Valero (TX) as the asphalt binder; an LLDPE-rich post-consumer recycled resin, Natura PCR sourced from Avangard Innovative (Houston TX) with a yellowness index of 35.56 as the recycled polymer component; ELVALOY™ RET EP 1177 sourced from DowDuPont (Wilmington DE) as the epoxy-functionalized ethylene copolymer; polyphosphoric acid (PPA) sourced from Innophos (Cranbury NJ).

To produce Comparative Examples 1, 2, 3, and 4, 450 grams (g) or 650 g of asphalt were poured into a modified blending can (as described above), and the lid and stirrer assembly were attached to the can. The modified blending can was heated to 165° C. and, once the temperature had stabilized, either the epoxy-functionalized ethylene copolymer or the recycled polymer component was added in the ratios indicated in Table 3 and mixed for two hours. Polyphosphoric acid was then added and mixed for one hour. The sample was then stored in a 163° C. oven overnight before testing was performed.

TABLE 3

Compositions of Comparative Examples 1-4.

| SAMPLE | PCR (wt. %) | ELVALOY™ (wt. %) | SBS (wt. %) | PPA (wt. %) | BGA (wt. %) |
| --- | --- | --- | --- | --- | --- |
| Comparative 1 | 0 | 0 | 0 | 0.2 | 0 |
| Comparative 2 | 1.5 | 0 | 0 | 0 | 0 |
| Comparative 3 | 3 | 0 | 0 | 0 | 0 |
| Comparative 4 | 0 | 0.9 | | 0.2 | |

Comparative Example 5

The materials used to produce Comparative 5 included asphalt binder sourced from Valero (TX) as the asphalt binder; an LLDPE-rich post-consumer recycled resin, Natura PCR sourced from Avangard Innovative (Houston TX) with a yellowness index of 35.56 as the recycled polymer component; D1101 sourced from Kraton (Houston TX) as the styrene/conjugated diene copolymer; and BGA sourced from Ergon, Inc. as an additive.

To produce Comparative Example 5, 650 g asphalt were poured into a modified blending can (as described above), and the lid and stirrer assembly were attached to the can. The modified blending can was heated to 165° C. and, once the temperature had stabilized, styrene/conjugated diene copolymer was added in the ratios indicated in Table 4 and mixed for two hours. BGA was then added and mixed for one hour. The sample was then stored in a 163° C. oven overnight before testing was performed.

TABLE 4

Compositions of Comparative Example 5.

| SAMPLE | PCR (wt. %) | ELVALOY ™ (wt. %) | SBS (wt. %) | PPA (wt. %) | BGA (wt. %) |
|---|---|---|---|---|---|
| Comparative 5 | 1.5 | 0 | 1.8 | 0 | 0.2 |

Comparative Examples 6-8

The materials used to produce Comparative Examples 6-8 below included asphalt binder sourced from Marathon Petroleum Corporation (Detroit MI) as the asphalt binder (PG58-28); an LLDPE-rich post-industrial recycled (PIR) resin with a yellowness index of 12.36 as the recycled polymer component containing approximately 75% LLDPE, 20% polyamide, and 5% ethylene vinyl alcohol; ELVALOY™ RET EP 1177 sourced from Dow Inc. (Midland MI) as the epoxy-functionalized ethylene copolymer; polyphosphoric acid (PPA) sourced from Innophos (Cranbury NJ); D1101 sourced from Kraton (Houston TX) as the styrene/conjugated diene copolymer; and sulfur sourced from Sigma Aldrich as an additive.

To produce Comparative Examples 6, 7, and 8, approximately 300 to 400 grams (g) or of asphalt were poured into a modified blending can (as described previously). A high shear blender was used to process the post-industrial recycle (PIR) and SBS at 155° C. to 185° C. until the blends were homogeneous (usually 10 to 30 minutes). The blends were then transferred to the lid and stirrer assembly previously described (low shear blending). The modified blending can was heated to 185° C. and, once the temperature had stabilized, the epoxy-functionalized ethylene copolymer was added in the ratios indicated in Table 5 and mixed for two hours. Polyphosphoric acid was then added and mixed for one hour. For the SBS blend, sulfur was added and mixed for 2 hours. The samples were then stored in a 163° C. oven overnight before testing was performed.

TABLE 5

Compositions of Comparative Examples 6-8.

| SAMPLE | PIR (wt. %) | ELVALOY ™ (wt. %) | SBS (wt. %) | PPA (wt. %) | BGA (wt. %) | S (wt. %) |
|---|---|---|---|---|---|---|
| Comparative 6 | 0 | 0 | 0 | 0 | 0 | 0 |
| Comparative 7 | 2 | 0 | 0 | 0 | 0 | 0 |
| Comparative 8 | 2 | 0 | 3.2 | 0 | 0 | 0.2 |

Comparison of Comparative Examples 1-8 and Examples 1-5

Table 6 provides a summary of the compositions of Examples 1-5 and Comparative Examples 1-8 grouped by amount of recycled polymer component (RPC).

TABLE 6

Compositions of Examples 1-5 and Comparative Examples 1-8.

| SAMPLE | RPC (wt. %) | ELVALOY ™ (wt. %) | SBS (wt. %) | PPA (wt. %) | BGA (wt. %) | S (wt. %) |
|---|---|---|---|---|---|---|
| Comparative 6 | 0 | 0 | 0 | 0 | 0 | 0 |
| Comparative 1 | 0 | 0 | 0 | 0.2 | 0 | 0 |
| Comparative 4 | 0 | 0.9 | 0 | 0.2 | 0 | 0 |
| Comparative 2 | 1.5 | 0 | 0 | 0 | 0 | 0 |
| Comparative 5 | 1.5 | 0 | 1.8 | 0 | 0.2 | 0 |
| Example 1 | 1.5 | 0.9 | 0 | 0.2 | 0 | 0 |
| Example 2 | 1.5 | 1.8 | 0 | 0.2 | 0 | 0 |
| Comparative 7 | 2 | 0 | 0 | 0 | 0 | 0 |
| Comparative 8 | 2 | 0 | 3.2 | 0 | 0 | 0.2 |
| Example 5 | 2 | 1.6 | 0 | 0.32 | 0 | 0 |
| Comparative 3 | 3 | 0 | 0 | 0 | 0 | 0 |
| Example 3 | 3 | 0.9 | 0 | 0.2 | 0 | 0 |
| Example 4 | 3 | 1.8 | 0 | 0.2 | 0 | 0 |

For Examples 1-5 and Comparative Examples 1-8, Dynamic Shear Rheometer failure temperature and phase angle was measured according to AASHTO T315-12, Multiple Stress Creep and Recovery was measured according to AASHTO T350-14, and Intermediate temperature testing was performed at 25° C. using AASHTO T315 after aging according to AASHTO T240-13 and AASHTO R28-12. The Dynamic Shear Rheometer measurements for upper continuous grade, phase angle, and elastic recovery; the Multiple Stress Creep and Recovery measurements for % recovery at 3.2 kPA (% $R_{3.2}$), $J_{nr}$ at 3.2 kPA ($J_{nr,3.2}$), and Z-factor; and the results of the intermediate temperature testing measurements are provided in Table 7.

TABLE 7

Comparison of Examples 1-5 and Comparative Examples 1-8.

| SAMPLE | Upper Cont. Grade (° C.) | Phase Angle (°) | Elastic Rec. (%) | % Rec. 3.2 kPa | $J_{nr}$ (kPa$^{-1}$) 3.2 kPa | Z-factor | G*sin(δ) 25° C. (kPa) |
|---|---|---|---|---|---|---|---|
| Comparative 6 | 61.2 | 88.2 | 15 | 0 | 5.95 | −19 | — |
| Comparative 1 | 69.4 | 84.60 | 27.50% | 4.4 | 1.644 | −21 | 3266 |
| Comparative 4 | 79.4 | 73.00 | 60.00% | 61.5 | 0.256 | 19 | 2577 |
| Comparative 2 | 79 | 82.10 | Broke* | 19.9 | 0.559 | −14 | 4356 |
| Comparative 5 | 84.5 | 78.60 | 60.00% | 51.5 | 0.254 | 9 | 3973 |
| Example 1 | 83.3 | 72 | 52.50% | 60.8 | 0.251 | 19 | 3094 |
| Example 2 | 93.6 | 59.5 | 67.50% | 86.3 | 0.053 | 23 | 2616 |
| Comparative 7 | 64.5 | 87 | 26 | 0 | 4.31 | −20 | 6350 |
| Comparative 8 | — | — | — | — | — | — | 5440 |
| Example 5 | 69.8 | 73.7 | 79 | 31 | 0.81 | 6 | 4805 |
| Comparative 3 | 82.5 | 82.90 | Broke* | 27.8 | 0.322 | −12 | 4424 |
| Example 3 | 87.2 | 70.3 | 50.00% | 66 | 0.15 | 18 | 3828 |
| Example 4 | 96 | 62.3 | 62.50% | 87.1 | 0.041 | 19 | 3025 |

*Sample broke for Comparative Example 2 and Comparative Example 3.

As shown in Tables 6 and 7, compared to Comparative Example 1 having neither recycled polymer component nor epoxy-functionalized ethylene copolymer, all of Examples 1-4 demonstrated higher continuous grading, which indicates the recycled polymer component and epoxy-functionalized ethylene copolymer increase the modulus of the asphalt samples. Additionally, Examples 1-4 having a mixture of recycled polymer component (PCR) and epoxy-functionalized ethylene copolymer were found to have increased (improved) upper continuous grading as compared to Comparative Examples 2-4 having only one of either the recycled polymer component (PCR) (Comparative Examples 2-3) or the epoxy-functionalized ethylene copolymer (Comparative Example 4). Also, Examples 2-3 were found to have increased (improved) upper continuous grading as compared to Comparative Examples 5 having the combination of the recycled polymer component (PCR) with styrene/conjugated diene copolymer and BGA.

As shown in Tables 6 and 7, compared to Comparative Example 6, having neither recycled polymer component nor epoxy-functionalized ethylene copolymer, Comparative Example 7, having 2% PIR, demonstrated only an improvement of 3 degrees for continuous grading, which indicates the recycled polymer component did not significantly increase the modulus of the asphalt samples, improve the phase angle, or demonstrate high elastic recovery. Examples 5 having a mixture of recycled polymer component (PIR) and epoxy-functionalized ethylene copolymer were found to have increased (improved) upper continuous grading as compared to Comparative Examples 6 and 7.

As stated previously, desirably, phase angles are below 75° for most asphalt applications. In Examples 1-4, the combination of recycled polymer component and epoxy-functionalized ethylene copolymer was found to reduce (improve) the phase angle, whereas Comparative Examples 1-5 showed a higher (poorer) phase angle than Examples 1-4. Additionally, in Example 5, the combination of recycled polymer component and epoxy-functionalized ethylene copolymer was found to reduce (improve) the phase angle, whereas Comparative Examples 6-8 showed a higher (poorer) phase angle than Example 5.

As discussed previously, it is believed a higher percent elastic recovery implies more elastic behavior of the sample after deformation. As shown in Table 7, Examples 1-4 having a combination of recycled polymer component and epoxy-functionalized ethylene copolymer were found to have increased (improved) elastic recovery compared to Comparative Examples 1-3, which demonstrated low (poor) elastic recovery or broke. Also, Examples 2 and 4 showed increased (improved) elastic recovery compared to Comparative Examples 4 and 5 having only the epoxy-functionalized ethylene copolymer or a combination of the recycled polymer component with styrene/conjugated diene copolymer and BGA. Example 5 having a combination of recycled polymer component and epoxy-functionalized ethylene copolymer was found to have increased (improved) elastic recovery compared to Comparative Examples 6 and 7.

Also as shown in Table 7, Examples 1-4 having a combination of the recycled polymer component (PCR) and epoxy-functionalized ethylene copolymer were found to increase (improve) the % recovery and reduce the non-recoverable creep compliance ($J_{nr}$) compared to Comparative Examples 1-3, which demonstrated lower (poorer) % recovery. Additionally, Comparative Example 5 and Example 1 had similar $J_{nr,3.2}$ values, which may indicate a similar resistance to creep. However, Example 1 showed a significantly improved % recovery as compared to Comparative Example 5. Example 5 having a combination of the recycled polymer component (PIR) and epoxy-functionalized ethylene copolymer were found to increase (improve) the % recovery and reduce the non-recoverable creep compliance ($J_{nr}$) compared to Comparative Examples 6 and 7, which demonstrated lower (poorer) % recovery. Additionally, Example 5 had improved $J_{nr,3.2}$ values, which may indicate an improvement in resistance to creep, and a significantly improved % recovery as compared to Comparative Examples 6 and 7.

The Z-factor of an asphalt composition is defined by how far above (positive number) or below (negative number) the sample is for the equation % $R_{3.2}=29.371(J_{nr,3.2})^{-0.2633}$, or "29 line," on a plot of % $R_{3.2}$ vs $J_{nr,3.2}$. Conventionally, an unmodified asphalt composition has a negative Z-factor value (below the 29 line), while an asphalt composition modified with a polymer may have a Z-factor value that is positive (above the 29 line). Here, each of Examples 1-5 had a positive Z-factor value. Examples 1-4 also have higher Z-factors than Comparative Example 5. Comparative Examples 2-3 and 8 exhibit negative Z-factor values, which were surprising for a modified asphalt composition.

As stated previously, the maximum allowed value of G*sin(δ) is 5000 kPa at grade temperature, and lower values of G*sin(δ) are preferred. As shown in Table 7, Examples 1-4 having a combination of the recycled polymer component and epoxy-functionalized ethylene copolymer were found to have lower G*sin(δ) values compared to Comparative Examples 2-3 and 5. Examples 5 having a combination of the recycled polymer component and epoxy-functionalized ethylene copolymer was found to have lower G*sin(δ) values compared to Comparative Example 7 and 8.

The stiffness and m-value of the aged Comparative Examples 1-5 and Examples 1-4 were tested using AASHTO T313-12 as previously described. The results for stiffness and m-value are provided in Table 8.

TABLE 8

Stiffness results of Comparative Examples 1-5 and Examples 1-4.

| SAMPLE | Stiffness (mPa) | M-value |
| --- | --- | --- |
| Comparative 1 | 144 | 0.340 |
| Comparative 2 | 156 | 0.317 |
| Comparative 3 | 170 | 0.302 |
| Comparative 4 | 148 | 0.337 |
| Comparative 5 | 146 | 0.338 |
| 1 | 141 | 0.318 |
| 2 | 163 | 0.320 |
| 3 | 144 | 0.335 |
| 4 | 171 | 0.309 |

In Examples 1-4, the combination of the recycled polymer component and epoxy-functionalized ethylene copolymer were found to have meet stiffness values of less than 300 MPa and m-values greater than 0.300. Therefore, Examples 1-4 appeared to exhibit comparable stiffness and m-values compared to Comparative Examples 2-3 and 5.

The separation properties, which are provided in Table 9, of Comparative Examples 2, 3, and 5 and Examples 1 and 4 were measured according to ASTM D5976 as previously described.

TABLE 9

Separation properties of Comparative Examples 2, 3, and 5 and Examples 1 and 4.

| SAMPLE | Separation, ΔT ° C. |
| --- | --- |
| Comparative 2 | 43+ |
| Comparative 3 | 41+ |
| Comparative 5 | 18 |
| 1 | −0.2 |
| 4 | 0 |

As stated previously, a separation difference of 2.2° C. or less is considered a passing result. The results provided in Table 9 show that Comparative Examples 2 and 3 having only the recycled polymer component failed the separation test. Examples 1 and 4 having a combination of the recycled polymer component and epoxy-functionalized ethylene copolymer passed the separation test.

The force ductility ratio of Comparative Example 8 and Example 5 were tested using AASHTO T300 as previously described. The results are provided in Table 10 for 4° C.

TABLE 10

Force ductility ratio results of Comparative Examples 8 and Example 5.

| SAMPLE | Force Ductility ratio |
| --- | --- |
| Comparative 8 | 0 |
| Example 5 | 0.4 |

In Examples 5, the combination of the recycled polymer component and epoxy-functionalized ethylene copolymer were found to have a force ductility ratio of 0.4 compared to Comparative Example 8 with a ratio of 0. A higher force ductility ratio is considered to offer performance improvements. As specified by Michigan DOT for the PG64-28P specification, a minimum force ductility ratio of 0.3 is required.

Based on these results in Tables 7-10, Examples 1-4 show that embodiments of the present disclosure may provide asphalt compositions that include asphalt binder; a recycled polymer component; and an epoxy-functionalized ethylene copolymer, which may improve the performance of the asphalt compositions as compared to asphalt compositions with only the recycled polymer component or only the epoxy-functionalized ethylene copolymer. Examples 1-5 may further show that embodiments of the present disclosure may provide a sustainable asphalt composition with improved efficiency, which may be achieved by the incorporation of the recycled polymer component. Additionally, incorporating the epoxy-functionalized ethylene may allow for the incorporation of more recycled polymer component with improved performance results.

Comparative Examples 9-11 and Examples 6-7

The materials used to produce Comparative Examples 9-11 and Examples 6-7 included REVAP, produced by Petrobrás (São José dos Campos—SP-Brazil) as an asphalt binder. Comparative Example 10 and Examples 6-7 included ELVALOY™ RET 5160, sourced from DowDuPont (Wilmington DE—US) as an epoxy-functionalized ethylene copolymer and polyphosphoric acid (PPA) sourced from Arkema Química Ltda (Rio Claro—SP—Brazil). Comparative Example 11 and Examples 6-7 the recycled polymer component, used to produce Examples 9-13 included an HDPE-rich post-consumer recycled resin (PCR), which included traces of polypropylene and LDPE. The PCR resin was sourced from a Wortex recycling extrusion single screw line with a 60 mm diameter and L/D of 42. The PCR exhibited a melt index of 0.3352±0.0060 (measured at 190° C. and 2.16 kg load); a melt index of 38.9057±1.2153 (measured at 190° C. and 21.60 kg load), and a density of 0.9602±0.0004 g/cm³. The PCR had a yellowness index of −32.33, when measured according to ASTM D6290 and exhibited a blue color (as indicated by a measured Δb*− 4.86).

To produce Comparative Examples 9-11 and Examples 6-7, 2000 grams (g) of asphalt were poured into a modified blending can, which was attached to a lid and stirrer assembly. The modified blending can was heated to 180° C. and, once the temperature had stabilized, one or more of the epoxy-functionalized ethylene copolymer, the recycled polymer component, and the polyphosphoric acid were added in the ratios as indicated in Table 11. The epoxy-functionalized ethylene copolymer and the recycled polymer component were added and mixed in a turbulent system for 1.5 hours. The polyphosphoric was then added and mixed for 0.5 hour. The sample was then stored in a 163° C. oven overnight before testing was performed.

Table 11 provides a summary of the compositions of Comparative Examples 9-11 and Examples 6-7 grouped by amount of recycled polymer component (RPC).

TABLE 11

Compositions of Comparative Examples 9-11 and Examples 6-7.

| SAMPLE | RPC (wt. %) | ELVALOY ™ (wt. %) | PPA (wt. %) | Asphalt Binder (wt. %) |
|---|---|---|---|---|
| Comparative 9 | 0.00 | 0.00 | 0.00 | 100.00 |
| Comparative 10 | 0.00 | 2.00 | 0.15 | 97.85 |
| Comparative 11 | 2.00 | 0.00 | 0.00 | 98.00 |
| Example 6 | 2.00 | 1.00 | 0.15 | 96.85 |
| Example 7 | 2.00 | 2.00 | 0.15 | 95.85 |

Comparison of Comparative Examples 9-11 and Examples 6-7

For Comparative Examples 9-11 and Examples 6-7, Multiple Stress Creep and Recovery (MSCR), percent recovery (% $R_{3.2}$), $J_{nr,3.2}$, Multiple Dynamic Shear Rheometer (DSR) upper continuous grade temperature and phase angle, were measured according to the methods described previously in this disclosure. According to the methodology ASTM D6373 the upper continuous Performance Grade temperature will be defined where G*/sin(δ) equals 1.0 kPa. The properties of Comparative Examples 9-11 and Examples 6-7 are provided in Tables 12-16.

TABLE 12

MSCR and DSR results for Comparative Example 9.

| Temperature (° C.) | % Rec. 3.2 kPa | Jnr (kPa$^{-1}$) 3.2 kPa | Z-factor | Phase angle (°) | G*/sin(δ) (kPa)[1] |
|---|---|---|---|---|---|
| 58 | 0.0 | 3.15 | −22 | 85 | 5.6 |
| 64 | 0.1 | 7.52 | −17 | 87 | 2.4 |
| 70 | 0.0 | 16.4 | −14 | 88 | 1.1 |
| 76 | 0.0 | 33.6 | −12 | 89 | 0.6 |
| 82 | — | — | — | 89 | 0.3 |
| 88 | — | — | — | 89 | 0.1 |
| 94 | — | — | — | 89 | 0.1 |
| 100 | — | — | — | 89 | 0.1 |

[1]DSR - Not aging sample

TABLE 13

MSCR and DSR results for Comparative Example 10.

| Temperature (° C.) | % Rec. 3.2 kPa | Jnr (kPa$^{-1}$) 3.2 kPa | Z-factor | Phase angle (°) | G*sin(δ) 25° C. (kPa)[1] |
|---|---|---|---|---|---|
| 58 | 73.5 | 0.07 | 14 | 68 | 7.8 |
| 64 | 64.9 | 0.15 | 16 | 67 | 4.3 |
| 70 | 59.4 | 0.37 | 21 | 67 | 2.4 |
| 76 | 47.6 | 0.86 | 17 | 68 | 1.4 |
| 82 | — | — | — | 69 | 0.8 |
| 88 | — | — | — | 71 | 0.5 |
| 94 | — | — | — | 74 | 0.3 |
| 100 | — | — | — | 76 | 0.2 |

[1]DSR - Not aging sample

TABLE 14

MSCR and DSR results for Comparative Example 11.

| Temperature (° C.) | % Rec. 3.2 kPa | Jnr (kPa$^{-1}$) 3.2 kPa | Z-factor | Phase angle (°) | G*/sin(δ) (kPa)[1] |
|---|---|---|---|---|---|
| 58 | 21.0 | 0.14 | −28 | 34 | 106.4 |
| 64 | 7.3 | 0.45 | −29 | 29 | 88.3 |
| 70 | 0.5 | 1.22 | −27 | 25 | 78.0 |
| 76 | 0.1 | 2.99 | −22 | 21 | 81.6 |
| 82 | — | — | — | 19 | 76.0 |
| 88 | — | — | — | 18 | 65.9 |
| 94 | — | — | — | 18 | 54.6 |
| 100 | — | — | — | 18 | 44.0 |

[1]DSR - Not aging sample

TABLE 15

MSCR and DSR results for Example 6.

| Temperature (° C.) | % Rec. 3.2 kPa | Jnr (kPa$^{-1}$) 3.2 kPa | Z-factor | Phase angle (°) | G*/sin(δ) (kPa)[1] |
|---|---|---|---|---|---|
| 58 | 44.9 | 0.14 | −4 | 72 | 15.4 |
| 64 | 40.5 | 0.26 | −1 | 73 | 7.6 |
| 70 | 30.0 | 0.67 | −3 | 73 | 3.9 |
| 76 | 17.1 | 1.60 | −9 | 74 | 2.3 |
| 82 | — | — | — | 76 | 1.3 |
| 88 | — | — | — | 78 | 0.7 |
| 94 | — | — | — | 80 | 0.4 |
| 100 | — | — | — | 82 | 0.2 |

[1]DSR - Not aging sample

TABLE 16

MSCR and DSR results for Example 7.

| Temperature (° C.) | % Rec. 3.2 kPa | Jnr (kPa$^{-1}$) 3.2 kPa | Z-factor | Phase angle (°) | G*/sin(δ) (kPa)[1] |
|---|---|---|---|---|---|
| 58 | 59.7 | 0.04 | −8 | 66 | 16.6 |
| 64 | 51.2 | 0.10 | −3 | 65 | 8.9 |
| 70 | 52.5 | 0.20 | 8 | 64 | 5.0 |
| 76 | 43.0 | 0.46 | 7 | 65 | 2.9 |
| 82 | — | — | — | 66 | 1.8 |
| 88 | — | — | — | 68 | 1.1 |
| 94 | — | — | — | 70 | 0.7 |
| 100 | — | — | — | 72 | 0.4 |

[1]DSR - Not aging sample

As shown in Table 12, Comparative Example 9 represents a sample without any recycled polymer component or epoxy-functionalized ethylene copolymer, and Comparative Example 9 and exhibited $J_{nr,3.2}$ and % $R_{3.2}$ values of 33.6 and 0.0%, respectively. These results failed to meet the minimum requirements according to the methodology AASHTO T350. As shown in Table 13, Comparative Example 10, including epoxy-functionalized ethylene copolymer but no recycled polymer component, exhibited a % $R_{3.2}$ higher than 3500 (47.6%) and $J_{nr,3.2}$ between 0.51 and 1.00 (0.86), when both properties were measured at 76° C. As shown in Table 14, Comparative Example 11, including recycled polymer component but no epoxy-functionalized ethylene copolymer delivered poor performance in comparison to Comparative Example 10, when evaluated at 3.2 kPa and 76° C., once the $J_{nr,3.2}$ was 2.99 and the R % was 0.1%. Accordingly, it appears that a composition having only PCR appears to exhibit properties below to the minimum required standard (S) level of traffic, according to the methodology AASHTO T350.

Additionally, as shown in Table 15, Example 6, when evaluated at 3.2 kPa and 70° C., exhibited $J_{nr,3.2}$ was 0.67 and the % $R_{3.2}$ was 30%, and Example 6 meets a classification of Standard (S) traffic load. As shown in Table 16, Example 7 exhibited comparable performance in comparison to the standard formulation Comparative Example 10, when evaluated at 3.2 kPa and 76° C., exhibiting $J_{nr,3.2}$ of 0.46 and % $R_{3.2}$ of 43%. Example 7 therefore exhibited characteristics that meet a classification similar to High (H) level of traffic, according to the methodology AASHTO T350.

As previously explained, the Z-factor of an asphalt composition is defined by how far above (positive number) or below (negative number) the sample is for the equation % $R_{3.2}=29.371(J_{nr,3.2})^{-0.2633}$, or "29 line," on a plot of % $R_{3.2}$ vs $J_{nr,3.2}$. Conventionally, an unmodified asphalt composition has a negative Z-factor value (below the 29 line), while an asphalt composition modified with a polymer may have a Z-factor value that is positive (above the 29 line). Here, Comparative Example 10 had positive Z-factor values, and Example 7 had positive Z-factor values at only 70° C. and 76° C. It was not unexpected for Comparative Example 9, the neat asphalt composition, to exhibit negative values. However, Comparative Example 11, Example 6, and Example 7 (at 58° C. and 64° C.) exhibited negative Z-factor values, which were surprising for a modified asphalt composition.

The phase separation properties, which are provided in Table 17, of Comparative Example 10 and Examples 6-7 were measured according to ASTM D7173 as previously described.

TABLE 17

Phase separation results for the Comparative Example 10 and Examples 6-7.

| SAMPLE | Phase separation after 48 hours (° C.) Top - Bottom difference |
|---|---|
| Comparative 10 | 1.0 |
| Example 6 | 2.0 |
| Example 7 | 1.3 |

Based on these results in Tables 11-17, Examples 6-7 show that embodiments of the present disclosure may provide asphalt compositions that include asphalt binder; a recycled polymer component; and an epoxy-functionalized ethylene copolymer, which may improve the performance of the asphalt compositions as compared to asphalt compositions with only the recycled polymer component or only the epoxy-functionalized ethylene copolymer. Examples 6-7 may further show that embodiments of the present disclosure may provide a sustainable asphalt composition, which may be achieved by the incorporation of the recycled polymer component. Additionally, incorporating the epoxy-functionalized ethylene may allow for the incorporation of more recycled polymer component with performance results that meet industry standards and are comparable to comparative asphalt compositions that do not have improved sustainability.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. An asphalt composition comprising:
   asphalt binder in about 70 to about 99.5 weight %, based on the total weight of the asphalt composition;
   a recycled polymer component in about 0.25 to 20 weight %, based on the total weight of the asphalt composition, wherein the recycled polymer component comprises:
      from 51 wt. % to 99.99 wt. % of a linear low density polyethylene, based on the total weight of the recycled polymer component;
      a polyamide; and
      an ethylene vinyl alcohol; and
   an epoxy-functionalized ethylene copolymer in about 0.1 to 10 weight %, based on the total weight of the asphalt composition, the epoxy-functionalized ethylene copolymer having the formula E/X/Y/Z,
      wherein E is the copolymer unit —$(CH_2CH_2)$— derived from ethylene;
      X is the copolymer unit —$(CH_2CR^1R^2)$—, where $R^1$ is hydrogen, methyl, or ethyl, and $R^2$ is carboalkoxy, acyloxy, or alkoxy of 1 to 10 carbon atoms, present in from 0 to about 40 weight % of the copolymer;
      Y is the copolymer unit —$(CH_2CR^3R^4)$—, where $R^3$ is hydrogen or methyl and $R^4$ is carboglycidoxy or glycidoxy present in from 0.1 to about 25 weight % of the copolymer;
      Z is the copolymer unit derived from comonomers including carbon monoxide, sulfur dioxide, acrylonitrile, or other monomers, present from 0 to about 10 weight % of the copolymer.

2. The asphalt composition of claim 1 wherein the recycled polymer component comprises from 1 wt. % to 99.99 wt. % of one or more of an ethylene-based polymer, a propylene-based polymer, a polyester, a poly(vinyl chloride), a polystyrene, or the polyamide, the ethylene vinyl alcohol, an ethylene vinyl acetate, or a poly-vinyl chloride based on the total weight of the recycled polymer component.

3. The asphalt composition of claim 1, wherein the recycled polymer component has a density of from about 0.858 grams per cubic centimeter (g/cc) to about 0.970 g/cc.

4. The asphalt composition of claim 1, wherein the recycled polymer component has a melt index, $I_2$, of less than about 20 grams per ten minutes (g/10 min) when measured according to ASTM D1238 at 190° C. and 2.16 kg load.

5. The asphalt composition of claim 1, wherein Y is selected from the group consisting of glycidyl acrylate, glycidyl methacrylate, glycidyl butyl acrylate, glycidyl vinyl ether, and combinations of two or more of glycidyl acrylate, glycidyl methacrylate, glycidyl butyl acrylate, and glycidyl vinyl ether.

6. The asphalt composition of claim 1, wherein the epoxy-functionalized ethylene copolymer is an ethylene vinyl acetate glycidyl methacrylate terpolymer, an ethylene n-butyl acrylate glycidyl methacrylate terpolymer or an ethylene methyl acrylate glycidyl methacrylate terpolymer.

7. The asphalt composition of claim 1, further comprising styrene/conjugated diene copolymer.

8. The asphalt composition of claim 1, further comprising an acid or anhydride.

9. The asphalt composition of claim 8, comprising the acid, wherein the acid is a polyphosphoric acid.

10. The asphalt composition of claim 8, comprising from 0.05 wt. % to 1 wt. % of the acid or anhydride, based on the total weight of the asphalt composition.

11. The asphalt composition of claim 1, wherein:
    the asphalt composition has an upper continuous grade greater than 58° C.;
    the asphalt composition has an elastic recovery greater than 50%;
    or both.

12. The asphalt composition of claim 1, wherein at least one of:
   the recycled polymer component further comprises at least 0.01 wt. % of contaminants based on the total weight of the recycled polymer component;
   the recycled polymer component has a yellowness index that is non-zero when measured according to ASTM D6290;
   or both.

13. A method of making an asphalt composition comprising:
   combining an asphalt binder, a recycled polymer component, and an epoxy-functionalized ethylene copolymer, the epoxy-functionalized ethylene copolymer having the formula E/X/Y/Z, wherein:
   E is the copolymer unit —($CH_2CH_2$)— derived from ethylene;
   X is the copolymer unit —($CH_2CR^1R^2$)—, where $R^1$ is hydrogen, methyl, or ethyl, and $R^2$ is carboalkoxy, acyloxy, or alkoxy of 1 to 10 carbon atoms, present in from 0 to about 40 weight % of the copolymer;
   Y is the copolymer unit —($CH_2CR^3R^4$)—, where $R^3$ is hydrogen or methyl and $R^4$ is carboglycidoxy or glycidoxy present in from 0.1 to about 25 weight % of the copolymer;
   Z is the copolymer unit derived from comonomers including carbon monoxide, sulfur dioxide, acrylonitrile, or other monomers, present from 0 to about 10 weight % of the copolymer; and
   wherein the recycled polymer component comprises:
      from 51 wt. % to 99.99 wt. % of a linear low density polyethylene, based on the total weight of the recycled polymer component;
      a polyamide; and
      an ethylene vinyl alcohol.

14. The asphalt composition of claim 1, further comprising a polyphosphoric acid or anhydride.

15. The asphalt composition of claim 1, comprising the epoxy-functionalized ethylene copolymer in about 1.0 to 10 weight %, based on the total weight of the asphalt composition.

16. The asphalt composition of claim 1, further comprising an anhydride.

17. The asphalt composition of claim 1, wherein the recycled polymer component has a yellowness index that is greater than 5 when measured according to ASTM D6290.

18. The asphalt composition of claim 1, wherein the recycled polymer component is selected from linear low density polyethylene-rich post-consumer recycled resin, linear low density polyethylene-rich post-industrial recycled resin, or combinations thereof.

* * * * *